April 21, 1925.

M. F. RUFFNER 1,534,078

VEGETABLE SLICING MACHINE

Filed July 11, 1924  3 Sheets-Sheet 1

Inventor
MEYER F. RUFFNER

By  C. L. Parker
Attorney

April 21, 1925.
M. F. RUFFNER
1,534,078
VEGETABLE SLICING MACHINE
Filed July 11, 1924  3 Sheets-Sheet 2
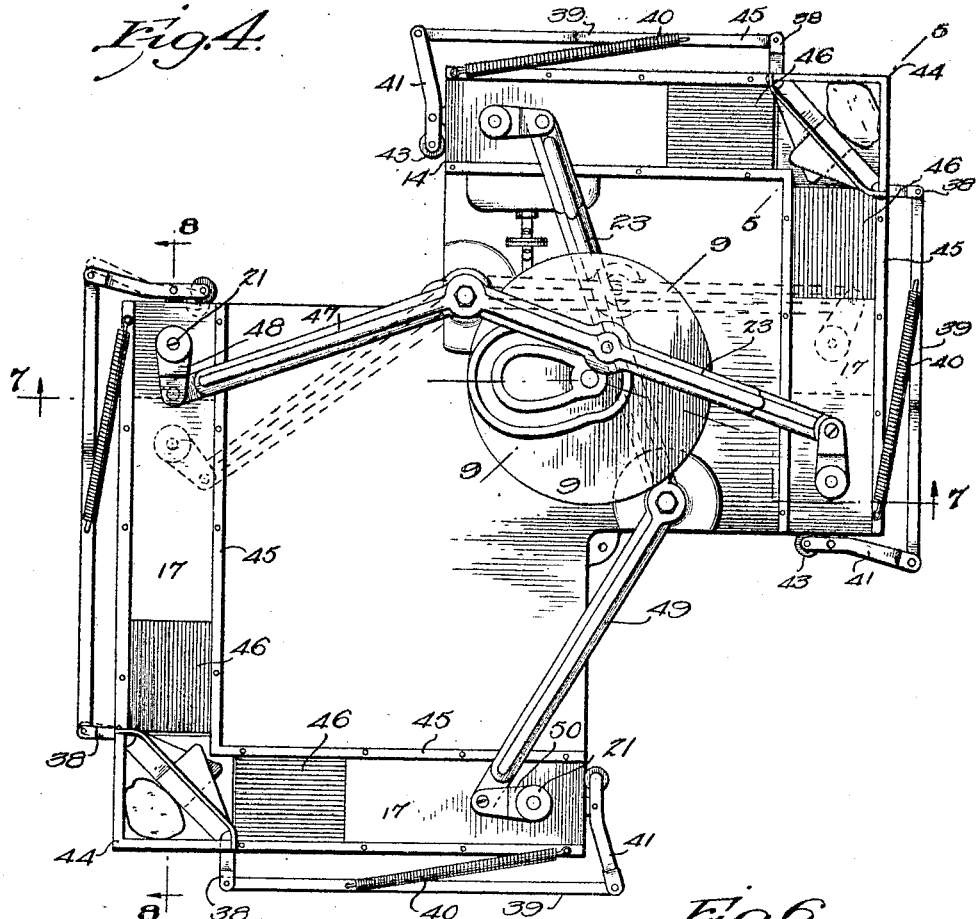
Inventor
MEYER F. RUFFNER April 21, 1925.
M. F. RUFFNER
1,534,078
VEGETABLE SLICING MACHINE
Filed July 11, 1924
3 Sheets-Sheet 3
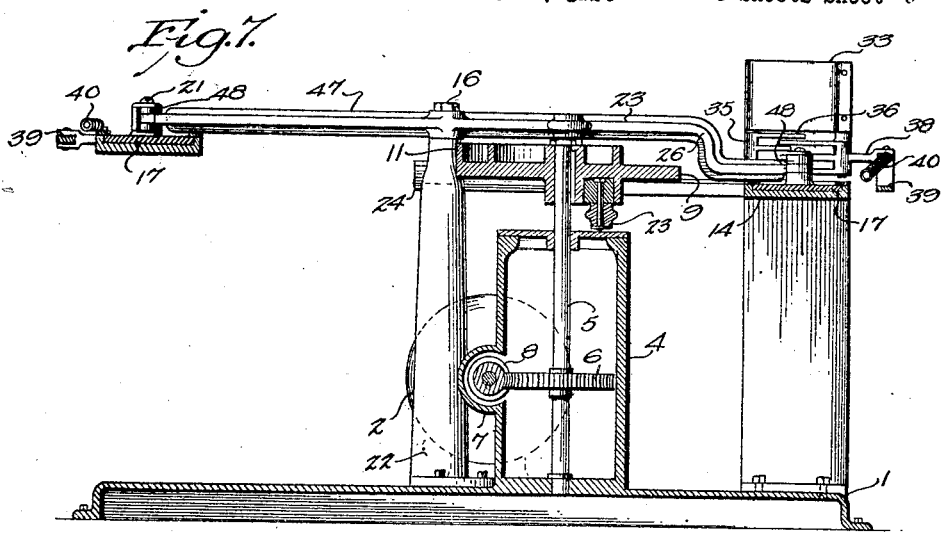
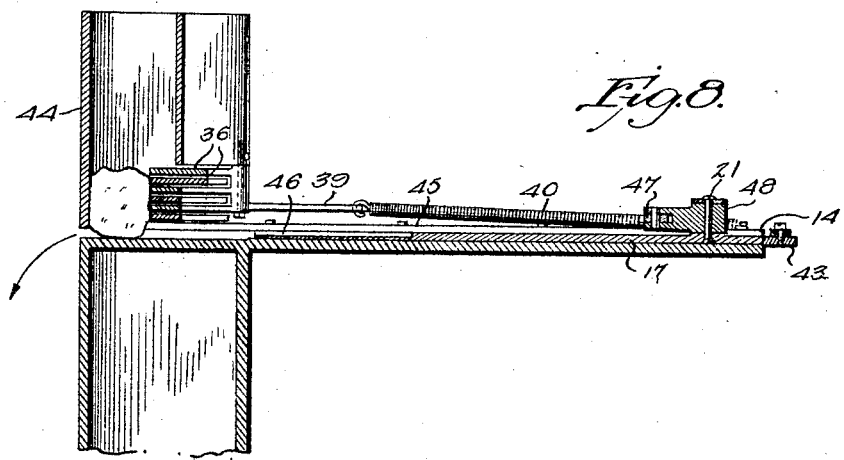
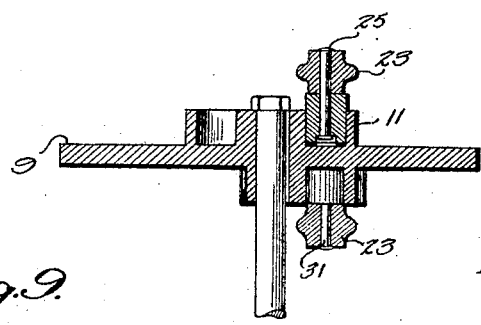
Inventor
MEYER F. RUFFNER
By
Attorney Patented Apr. 21, 1925.

1,534,078

UNITED STATES PATENT OFFICE.

MEYER F. RUFFNER, OF NEW YORK, N. Y., ASSIGNOR, BY MESNE ASSIGNMENTS, TO POTATO WAFFLES, INC., OF DOVER, DELAWARE, A CORPORATION OF DELAWARE.

VEGETABLE-SLICING MACHINE.

Application filed July 11, 1924. Serial No. 725,391.

*To all whom it may concern:*

Be it known that I, MEYER F. RUFFNER, a citizen of the United States, residing at New York, in the county of New York and State of New York, have invented certain new and useful Improvements in Vegetable-Slicing Machines, of which the following is a specification.

This invention relates to vegetable slicing machines, and is an improvement over the construction shown in my copending application filed November 23, 1922, Serial No. 602,866.

In the said prior application, there is provided a machine consisting of a pair of cutters arranged in the same plane and at right angles to each other, the said cutters being alternately reciprocated to slice the potatoes or other article into thin slices.

In the present application, I provide an apparatus broadly similar to the machine shown in my prior application and consisting of a pair of cutters together with means for alternately reciprocating the cutters.

An object of the present invention is the provision of improved driving means for alternating the cutters whereby a more compact machine is provided having less parts and less likely to get out of order.

A further object is the provision of means for holding a potato or other article during the cutting operation and then releasing it to permit it to feed by gravity into position for the next cut.

Figure 1:
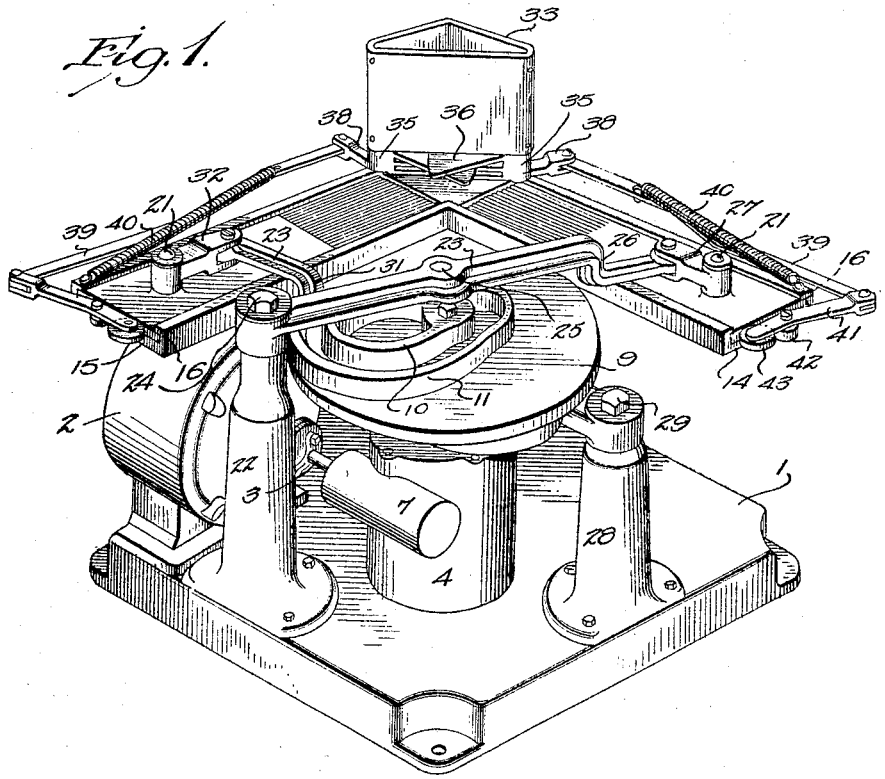
Figure 2:
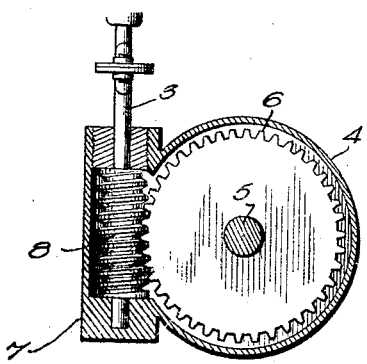
Figure 3:
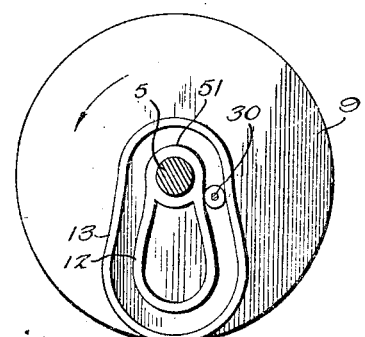

In the accompanying drawings, I have shown several embodiments of the invention. In this showing:

Figure 1 is a perspective view of an apparatus comprising a single pair of cutters, Figure 2 is a detail sectional view showing a portion of the drive mechanism, Figure 3 is a bottom plan view of the cam for driving the cutters, Figure 4 is a plan view of another form of the machine showing two pairs of cutters driven from a single cam, Figure 5 is a vertical sectional view on line 5—5 of Figure 4, Figure 6 is a detail perspective view of one of the cutters, Figure 7 is a vertical sectional view on line 7—7 of Figure 4, Figure 8 is a vertical sectional view on line 8—8 of Figure 4, and, Figure 9 is a similar view on line 9—9 of Figure 4.

Referring to Figures 1 to 3 of the drawings, the reference numeral 1 designates the base of the machine. A motor 2 is mounted on the base, the motor being provided with a shaft 3. A casing 4 is arranged centrally of the base and a main shaft 5 extends vertically of the casing and projects from the top. This shaft is provided with a gear 6, arranged in the same horizontal plane as the motor shaft 3. The casing 4 is provided with a housing 7 which receives the motor shaft and a worm 8 is mounted in this housing and is adapted to mesh with the gear 6. A cam 9 is arranged on the upper end of the shaft 5. This cam consists of a plate or disk having an upper track formed by a pair of spaced ribs 10 and 11.

A similar cam track is arranged on the bottom of the disk 9 and is formed by a pair of spaced ribs 12 and 13 (see Figure 3). A pair of supporting tables 14 and 15 are arranged beside the cam at right angles to each other. These tables are provided with guides 16 at each side, adapted to receive a plate 17, which carries a cutting element 18 (see Figure 6). The cutting element is fluted in transverse cross section, as shown. The plates are provided with enlargements 19 having central openings 20 for the reception of a pivot pin 21. A post or standard 22 is arranged at one side of the machine and a lever 23 is pivotally mounted on this post, as at 24. The lever carries a pin 25, adapted to be received in a cam groove formed by the upper ribs 10 and 11. Beyond the pin, the lever is extended downwardly, as at 26, and the outer end of the lever is pivotally connected to a bifurcated link 27 which is pivotally mounted on the pin 21. The other lever is similarly mounted on a post of standard 28, suitably supported on the base of the machine by means of a pivot pin 29. This lever extends beneath the cam and is provided with a pin 30 received in the lower cam track. The lever is provided with an upwardly extending portion 31, and is connected to a link 32, pivotally mounted on the pin 21 of the cutting element.

A hopper 33 is arranged at the corner of the machine where the tables 14 and 15 intersect and this hopper is adapted to receive the potatoes or other articles to be sliced.

As shown, the hopper is triangular in cross section and the front wall terminates at a distance above the table, as indicated at 34 in Figure 5 of the drawings. A set of gripping fingers is associated with each of the cutting elements, each set of gripping fingers being pivotally mounted at the side of the hopper, as at 35, and consisting of spaced fingers 36 and 37, the upper finger 36 being substantially wider than the lower fingers 37. The fingers of each set are arranged in alternate relation with the top finger of one set, arranged between the top finger and the second finger of the other set, as shown in Figure 5 of the drawings.

Each set of fingers is provided with an arm 38 extending beyond the pivot and a link 39 is connected to this arm. A coil spring 40 is connected to the link and to the table and is adapted to normally retain the finger in an operative position. An actuating lever 41 is connected to the link and this lever is pivotally mounted on a bracket 42 at the rear of the table. The end of the lever is provided with a roller 43, adapted to engage the rear edge of the plate 17 when the cutter is withdrawn.

In the form of the invention shown in Figures 4 to 9 of the drawings, the machine is of substantially the same construction but is provided with two hoppers 44, arranged diametrically opposite each other and a pair of tables 45, arranged at right angles to each other are associated with each of the hoppers. The tables are adapted to receive cutting elements 46 which are similar to the cutting elements heretofore described. The construction of the cam and cam tracks is the same as that heretofore described. The levers 23 are, however, extended beyond their pivots 24 and 29 to actuate the additional pair of cutting elements associated with the second hopper. As shown, the upper lever is provided with an extension 47 connected to a link 48, similar in construction to the link 27 and the lower lever is provided with an extension 49, connected to a similar link 50.

In the operation of the single form of the machine, each knife is adapted to be alternately reciprocated beneath the open side of the hopper through the space between the hopper and the table shown in Figure 5 of the drawings, to slice the potato or other article. Each of the cam tracks is provided with a concentric portion 51 and when the pin 25 or 30 is in the concentric portion of the cam, the knife is at rest at the rear of the table. In Figure 3 of the drawings, the pin is shown entering the concentric portion of the cam. When the pin leaves the concentric portion of the cam and starts to travel toward the edge of the disk, the lever 23 is swung on its pivot, moving the knife inwardly in a quick cutting stroke. As the pin returns to the center toward the concentric portion of the cam, the lever is swung on its pivot in a reverse direction, withdrawing the knife.

The spring 40 exercises a rearward pull on the arm 38 tending to move the gripping fingers of the corresponding set inwardly to grip the potato. During the cutting stroke, the action of the spring is not opposed and the fingers grip the potato at the same time the corresponding cutting element moves downwardly. When the corresponding cutting element moves rearwardly, the rear edge of the plate 17 engages the roller 43 to swing the lever 41 on its pivot and move the link 39 forwardly. This withdraws the gripping fingers 36 and 37. The gripping fingers of the other set move forward at practically the same time so that the potato feeds downwardly when it is released by one set of fingers, and is immediately grasped by the other set of fingers during the other cutting stroke.

In the double form of the machine, the movement of the lever 23—47 will project one cutting element of each set forwardly at the same time and the lever 23—49 will simultaneously withdraw the other set of cutting elements. The operation of the cams is the same as heretofore described and the only difference is the extension of the operating levers permits the machine of double capacity to be run from a single cam. It will be apparent from an inspection of Figure 1 of the drawings, that the cams are arranged at 90 degrees to each other in order that the knives or cutting elements may be alternately reciprocated.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

I claim:

1. In a device of the character described, a hopper, a pair of cutting elements arranged at right angles to each other and adapted to be reciprocated alternately beneath said hopper, a main shaft, a disk mounted on said shaft, said disk being provided with a pair of cam tracks, and pivoted levers connected to said cutting elements and engaging said cam tracks.

2. In a device of the character described, a hopper, a pair of cutting elements arranged at right angles to each other and adapted to be reciprocated alternately beneath said hopper, a main shaft, a disk mounted on said shaft, said disk being provided with cam tracks on its upper and lower faces, a pivoted lever extending over said disk and engaging said upper cam track, and a second pivoted lever arranged beneath said disk and engaging said lower cam track, each of said levers being connected to one of said cutting elements.

3. In a device of the character described, a hopper, tables arranged at right angles to each other and extending beneath said hopper, cutting elements mounted on said tables and adapted to be alternately reciprocated beneath said hopper, a main shaft, a disk mounted on said shaft, said disk being provided with a pair of cam tracks, and pivoted levers connected to said cutting elements and engaging said tracks.

4. In a device of the character described, a hopper, a cutting element adapted to be reciprocated beneath said hopper, gripping fingers arranged on the side of said hopper and adapted to engage an article within said hopper, and means controlled by the movement of said cutting element for actuating said gripping fingers.

5. In a device of the character described, a hopper, a cutting element adapted to be reciprocated beneath said hopper, gripping fingers pivotally mounted on said hopper, means for normally maintaining said gripping fingers in operative position, and means controlled by the reciprocation of said cutting element for moving said gripping fingers to an inoperative position.

6. In a device of the character described, a hopper, a cutting element adapted to be reciprocated beneath said hopper, gripping fingers pivotally mounted on said hopper, a spring operatively connected to said gripping fingers to normally retain them in an operative position, and means controlled by the reciprocation of said cutting element for moving said gripping fingers to an inoperative position.

7. In a device of the character described, a hopper, a cutting element adapted to be reciprocated beneath said hopper, gripping fingers pivotally mounted on said hopper, a link connected to said gripping fingers, a spring connected to said link to normally maintain said gripping fingers in operative position, a pivoted lever connected to said link, and a roller carried by said lever and arranged in the path of said cutting element to move said gripping fingers to an inoperative position when said cutting element is withdrawn.

8. In a device of the character described, a hopper, a cutting element adapted to be reciprocated beneath said hopper, a main shaft arranged adjacent said cutting element, a disk mounted on said shaft, said disk being provided with a cam track having a concentric portion extending throughout the greater part of a revolution and an eccentric portion extending throughout a lesser portion of a revolution, and a pivoted lever connected to said cutting element and engaging said track whereby said cutting element will be quickly reciprocated and withdrawn and then maintained in a withdrawn position for an appreciable length of time.

9. A device constructed in accordance with claim 8, wherein a pair of cutting elements are provided, arranged at right angles to each other, and a pair of cam tracks are provided arranged on opposite sides of said disk, said cam tracks being arranged with their eccentric portions spaced from each other, and a pair of pivoted levers are connected to said cutting elements and engaging said cam tracks whereby one of said cutting elements will be reciprocated while the other cutting element is in a withdrawn position.

In testimony whereof, I affix my signature.

MEYER F. RUFFNER.